United States Patent Office 2,980,735
Patented Apr. 18, 1961

2,980,735

PREPARATION OF AROMATIC AMINES

Herman S. Bloch, Skokie, Ill., assignor to Universal Oil Products Company, Des Plaines, Ill., a corporation of Delaware No Drawing. Filed May 4, 1959, Ser. No. 810,553

19 Claims. (Cl. 260—578)

This invention relates to a process for the preparation of aromatic amines from alkylcyclopentenes. More specifically, it relates to a process wherein an alkylcyclopentene is reacted with ammonia in the presence of a catalyst to yield an aromatic amine.

Aromatic amines, such as are prepared by the process of the present invention, find extensive and varied uses in themselves and as chemical intermediates in the preparation of rubber accelerators, antioxidants, dyes, pharmaceuticals, drugs, photographic chemicals, explosives, rocket fuels, resins, perfumes, and many others. For example, aniline is one of the most important substances for the preparation of dyes and intermediates. The "aniline for red" used for the preparation of red magenta dyes is a mixture of aniline and toluidine. One of the most extensively used dyes is aniline black formed when aniline is treated with dichromates, chlorates and other oxidizing agents.

A number of methods are currently employed for the preparation of aromatic amines. The reduction of nitro aromatic compounds with iron and hydrochloric acid, the catalytic vapor phase reduction using hydrogen, and the reaction of chloro aromatic compounds with aqueous amomnia in the presence of cuprous oxide are among the more prominent methods.

The ammonolysis of a suitable cycloolefin, capable of assuming an aromatic structure through dehydrogenation, would appear to be a logical approach to the preparation of aromatic amines. However, in the past, attempts to react a cycloolefin, such as cyclohexene, with ammonia have not been effective, resulting in extremely low recoveries of cyclohexylamine and aniline, the products consisting essentially of benzene and cyclohexane. To further illustrate the mechanics of the above reaction when cyclopentene is reacted with ammonia under like conditions the products are cyclopentadiene, cyclopentane and small amounts of cyclopentylamine.

A study of this reaction indicates that it can proceed by alternate paths. In one instance there is direct ammonolysis to the double bond of the cycloolefin, and this is to be preferred. In the other instance the cycloolefin is subjected to hydrogen disproportionation. The latter reaction appears to proceed at a rate substantially in excess of the former and in effect tends to subdue the preferred ammonolytic reaction.

As practiced in the present invention, the use of an alkylcyclopentene substantially increases the desired ammonolysis product. An alkylcyclopentene, when reacted in the presence of ammonia, may add the amino group to the double bond before isomerizing to the cyclohexylamine. The alkylcyclopentene may also isomerize, prior to ammonolysis, to the cyclohexene in which case the cyclohexene is subject to ammonolysis. The use of an alkylcyclopentene therefore substantially increases the ammonia addition reaction while reducing the concentration of cyclohexene, which readily disproportionates to benzene and cyclohexane. The reaction may be further illustrated symbolically as follows:

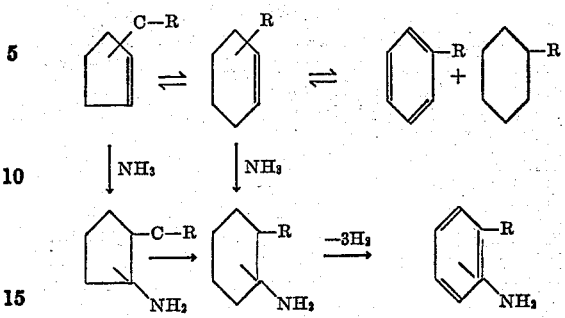

where R is an alkyl group or a hydrogen atom.

It is an object of the present invention to prepare aromatic amines in substantial yields through the catalytic reaction of ammonia with an alkylcycloolefin capable of assuming an aromatic character through isomerization and dehydrogenation.

It is a further object to utilize an alkylcyclopentene in said reaction, thereby presenting more favorable reaction conditions for the ammonolytic reaction while suppressing the hydrogen disproportionation tendency of cycloolefins.

In its broadest sense this invention embodies a process for the preparation of an aromatic amine which comprises reacting an alkylcyclopentene with ammonia in the presence of a catalyst comprising an acid-acting adsorptive support and a component selected from the group consisting of a metal of group VIII of the periodic table and the oxide of a metal of sub-groups V, VI and VII of the periodic table, and recovering the resulting aromatic amine.

A further embodiment resides in a process for the preparation of an aromatic amine which comprises reacting an alkylcyclopentene with ammonia in the presence of a catalyst comprising an alumina support and cobalt at a temperature of from about 200° C. to about 800° C. and at a pressure of from about atmospheric to about 700 p.s.i., and recovering the resulting aromatic amine.

Another embodiment resides in a process for the preparation of an aromatic amine which comprises reacting an alkylcyclopentene with ammonia in the presence of a catalyst comprising an alumina support and nickel at a temperature of from about 200° C. to about 800° C., and at a pressure of from about atmospheric to about 700 p.s.i., and recovering the resulting aromatic amine.

Still another embodiment resides in a process for the preparation of an aromatic amine which comprises reacting an alkylcyclopentene with ammonia in the presence of a catalyst comprising a silica-alumina support and cobalt, at a temperature of from about 400° C. to about 600° C. and at a pressure of from about 50 p.s.i. to about 500 p.s.i., and recovering the resulting aromatic amine.

A specific embodiment of this invention is in a process for the preparation of aniline which comprises reacting methylcyclopentene with ammonia in the presence of a catalyst comprising a silica-alumina support and cobalt at a temperature of from about 400° C. to about 600° C., and at a pressure of from about 50 p.s.i. to about 500 p.s.i., and recovering the resulting aniline.

Other objects and embodiments referring to the production of other aromatic amines will become apparent from the following detailed specifications.

In accordance with the objectives of this invention as set forth above an alkylcyclopentene is reacted with ammonia in the presence of a catalyst to form aromatic amines.

The ammonia which is employed to effect the ammonolysis of the alkylcyclopentene is anhydrous and may be of a pure or technical grade. Suitable alkylcyclopentenes include methylcyclopentene, 3-methylcyclopentene, 4-methylcyclopentene, 1,2-dimethylcyclopentene, 1,3-dimethylcyclopentene, 1,4-dimethylcyclopentene, 1,5-dimethylcyclopentene, 3,4-dimethylcyclopentene, 1,2,3-trimethylcyclopentene, 1,2,4-trimethylcyclopentene, 1,4,5-trimethylcyclopentene, 1,3,4-trimethylcyclopentene, 1,3,5-trimethylcyclopentene, 3,4,5-trimethylcyclopentene, ethylcyclopentene, 3-ethylcyclopentene, 4-ethylcyclopentene, 1-methyl-2-ethylcyclopentene, 1-methyl-3-ethylcyclopentene, 1-methyl-4-ethylcyclopentene, 1-methyl-5-ethylcyclopentene, 1,2-diethylcyclopentene, 1,3-diethylcyclopentene, 1,4-diethylcyclopentene, 1,5-diethylcyclopentene, etc. It is not intended to limit the generally broad scope of this invention to the above named compounds which are for the purpose of illustration only and it is contemplated that suitable higher homologs of the above named compounds may also be used.

The catalytic element of this process is selected from the group consisting of a metal of group VIII and the oxide of a metal of groups V, VI, and VII of the periodic table. Accordingly, a suitable metal component would include iron, cobalt, nickel, rhodium, ruthenium, palladium, osmium, iridium and platinum. In one of the preferred embodiments of the present invention the catalytic element is cobalt. In still another preferred embodiment the component is nickel. The oxide of a metal of groups V, VI and VII which can be used as a component of the catalyst includes the oxides of chromium, molybdenum, tungsten, vanadium, manganese, rhenium, tantalum, etc., vanadium oxide being preferred.

The selected catalytic element is supported on an acid-acting adsorbent material which has the added function of serving as an isomerization catalyst; for example, in the isomerization of methylcyclopentylamine to cyclohexylamine. Suitable acid-acting adsorbent materials include alumina, silica, boria, zirconia, thoria, etc., as well as a combination of two or more, such as silica-alumina, silica-zirconia, silica-alumina-zirconia, and the like, or the adsorbent acid-acting materials may be such as fuller's earth or activated clays. A preferred acid-acting adsorbent support is silica-alumina. It is understood that the materials set forth above are for the purpose of illustration and it is not intended to so limit the process of this invention. It is further understood that the composite which serves as the catalyst for this process may be prepared by any conventional or suitable method. For example, the salt of a metal of group VIII of the periodic table is made into an aqueous solution and the adsorbent material is then treated with this solution to form an aqueous slurry. The composite thus formed is dried and properly calcined.

The conditions under which the process of this invention is carried out are dependent on the particular reactants and catalyst employed. In general, elevated temperatures of from about 200° C. to about 800° C. are utilizable with a more restricted range of from about 400° C. to about 600° C. being preferred. The reaction pressure is maintained within a specified range by the addition of ammonia and the discharge of excess hydrogen resulting from the dehydrogenation step. Pressures ranging from about atmospheric to about 700 p.s.i. are suitable, the preferred range being from about 50 p.s.i. to about 500 p.s.i.

Ammonia in excess of stoichiometric amounts is utilized to insure a higher conversion of alkylcyclopentene to aromatic amine as well as to aid in preventing isomerization of the alkylcyclopentene to a cyclohexene. The mol ratio of ammonia to hydrocarbon will vary from about 1:1 to about 10:1 or more. A mol ratio of from about 2:1 to about 5:1 is preferred.

Contact times are kept at a minimum and a liquid hourly space velocity of from about 3.0 to about 6.0 is preferred although the broader range of from about 1.0 to about 10.0 can be employed where reactants and the reaction conditions permit.

The process of this invention may be effected in any suitable manner and may comprise either a batch or continuous flow type of operation. When a batch type operation is preferred the alkylcyclopentene and the catalyst are placed in a high pressure apparatus suitably designed for the introduction of gaseous reactants and equipped with heating and agitating devices. An autoclave can be so utilized. The gaseous ammonia is charged to the reaction vessel and the reactants brought to a predetermined reaction temperature and agitated. On completion of the proper residence time the reaction vessel is cooled to about room temperature and vented. The reaction product is decanted from the catalyst and subjected to any conventional means for separation and purification.

The process of this invention can be effected in a continuous flow system wherein the catalyst is disposed in a fixed bed within a suitable high pressure reactor and the reactants continually charged thereto by means of a compressor either in separate streams or in admixture with each other. The flow may be either upward or downward through the catalyst bed. A suitable high pressure reactor would include the necessary heating elements and may comprise an unpacked vessel or coil or it may be lined with an adsorbent packing material such as fire brick, dehydrated bauxite, alumina, or the like. The reactor effluent is passed to a high pressure separator where the gaseous and liquid phases are separated. The gaseous phase, consisting essentially of hydrogen, is continuously discharged through a pressure reducing valve while the liquid phases are passed through a pressure reducing valve to a separation chamber wherein the bulk of the ammonia is flashed off and recycled through a compressor to the reaction zone. The organic layer of the liquid phase is fed to a fractionating column for the separation of the product, the unreacted alkylcyclopentene and excess ammonia to be recycled back through the reactor.

The following described apparatus is utilized to set forth examples illustrating the process of the present invention.

100 cc. of catalyst is located in a fixed bed within a stainless steel tube which serves as a reactor. The reactor is inserted vertically in an electrically heated furnace. Liquid ammonia and an alkylcyclopentene are introduced to the reactor at a predetermined rate. The reactants are introduced through individual pumps, the liquid ammonia being charged from a high pressure cylinder equipped with a calibrated sight gage, the alkylcyclopentene being charged from a calibrated open cylinder. The reactor effluent is passed to a separator maintained at plant pressure and at about room temperature, wherein the hydrogen, resulting from the dehydrogenation reaction, is released through a pressure reducing valve in such a way as to maintain plant pressure. The liquid portion of the separator contents is metered through a pressure reducing valve to a separator vessel wherein the unreacted ammonia is flashed off and recycled to the reaction zone. The liquid product is continuously fed to a fractionating column for product recovery.

The following examples are given for the purpose of illustration only and it is not intended to thereby limit the generally broad scope of the present invention.

*Example I*

100 cc. of catalyst, comprising nickel adsorbed on silica-alumina, is inserted in the reactor and anhydrous ammonia and methylcyclopentene are charged thereto at the rate of about 300 cc. per hour. The charge consists of approximately 105 cc. of liquid ammonia and approximately 195 cc. of methylcyclopentene for a total liquid charge of about 300 cc. or a 3.0 LHSV. The reactor is maintained at a temperature of about 400° C. and at a pressure of about 300 p.s.i. for a 24 hour period. Recovery of aniline based on the methylcyclopentene charged amounted to a yield of approximately 20% with benzene, cyclohexane, methylcyclopentadiene and methylcyclopentane recovered as by-products.

Example II 100 cc. of catalyst, comprising cobalt adsorbed on silica-alumina, is inserted in the reactor and anhydrous ammonia and methylcyclopentene are charged thereto at the rate of about 300 cc. per hour. The charge consists of approximately 105 cc. of liquid ammonia and approximately 195 cc. of methylcyclopentene for a total liquid charge of about 300 cc. or a 3.0 LHSV. The reactor is maintained at a temperature of about 400° C. and at a pressure of about 300 p.s.i. for a 24 hour period. Recovery of aniline based on the methylcyclopentene charged amounted to a yield of approximately 23%, with benzene, cyclohexane, methylcyclopentadiene and methylcyclopentane recovered as by-products.

Example III 100 cc. of catalyst, comprising cobalt adsorbed on silica-alumina, is inserted in the reactor and anhydrous ammonia and 1,2-dimethylcyclopentene is charged thereto at a rate of about 300 cc. per hour. The charge consists of approximately 110 cc. of liquid ammonia and approximately 190 cc. of 1,2-dimethylcyclopentene for a total liquid charge of about 300 cc. or a 3.0 LHSV. The reactor is maintained at a temperature of about 500° C. and at a pressure of about 300 p.s.i. for a 24 hour period. The recovery of toluidines based on the 1,2-dimethylcyclopentene charged amounted to a yield of approximately 27% with toluene, methylcyclohexane, dimethylcyclopentadiene and dimethylcyclopentane recovered as by-products.

Example IV 100 cc. of catalyst comprising cobalt adsorbed on silica-alumina is inserted in a reactor and anhydrous alumina and ethylcyclopentene charged thereto at a rate of about 300 cc. per hour. The charge consists of approximately 110 cc. of liquid ammonia and approximately 190 cc. of ethylcyclopentene for a total liquid charge of about 300 cc. or a 3.0 LHSV. The reactor is maintained at a temperature of about 400° C. and at a pressure of about 350 p.s.i. for a 24 hour period. Recovery of toluidines based on the ethylcyclopentene charged amounted to a yield of approximately 21% with toluene, methylcyclohexane, ethylcyclopentadiene and ethylcyclopentane recovered as by-products.

Example V 100 cc. of catalyst comprising cobalt adsorbed on silica-alumina is placed in the reactor and anhydrous alumina and 1,2,4-trimethylcyclopentene charged thereto at a rate of about 300 cc. per hour. The charge consists of approximately 110 cc. of liquid ammonia and approximately 190 cc. of 1,2,4-trimethylcyclopentene for a total liquid charge of about 300 cc. or a 3.0 LHSV. The reactor is maintained at a temperature of about 500° C. and at a pressure of about 400 p.s.i. for a 24 hour period. Repentene charged amounted to a yield of approximately 24% with xylenes, dimethylcyclohexanes, trimethylcyclopentadienes and trimethylcyclopentanes recovered as by-products.

I claim as my invention:

1. A process which comprises reacting alkylcyclopentene hydrocarbon with ammonia in the presence of an acid-acting adsorptive support having deposited thereon a component selected from the group consisting of the metals of group VIII of the periodic table and the oxides of the metals of sub-groups V, VI, and VII of the periodic table, and recovering the resulting aromatic amine.

2. A process which comprises reacting monoalkylcyclopentene hydrocarbon with ammonia in the presence of an acid-acting adsorptive support having deposited thereon a component selected from the group consisting of the metals of group VIII of the periodic table and the oxides of the metals of sub-groups V, VI, and VII of the periodic table, and recovering the resulting aromatic amine.

3. A process which comprises reacting alkylcyclopentene hydrocarbon with ammonia in the presence of a metal of group VIII of the periodic table on an acid-acting adsorptive support, at an elevated temperature and pressure, and recovering the resulting aromatic amine.

4. A process which comprises reacting monoalkylcyclopentene hydrocarbon with ammonia in the presence of a metal of group VIII of the periodic table on an acid-acting adsorptive support, at an elevated temperature and pressure, and recovering the resulting aromatic amine.

5. A process which comprises reacting alkylcyclopentene hydrocarbon with ammonia in the presence of a metal of group VIII of the periodic table on an alumina support, at an elevated temperature and pressure, and recovering the resulting aromatic amine.

6. A process which comprises reacting monoalkylcyclopentene hydrocarbon with ammonia in the presence of a metal of group VIII of the periodic table on an alumina support, at an elevated temperature and pressure, and recovering the resulting aromatic amine.

7. A process which comprises reacting alkylcyclopentene hydrocarbon with ammonia in the presence of cobalt on an alumina support, at a temperature of from about 200° C. to about 800° C. and at a pressure of from about atmospheric to about 700 p.s.i., and recovering the resulting aromatic amine.

8. A process which comprises reacting monoalkylcyclopentene hydrocarbon with ammonia in the presence of cobalt on an alumina support, at a temperature of from about 200° C. to about 800° C. and at a pressure of from about atmospheric to about 700 p.s.i., and recovering the resulting aromatic amine.

9. A process which comprises reacting alkylcyclopentene hydrocarbon with ammonia in the presence of nickel on an alumina support at a temperature of from about 200° C. to about 800° C. and at a pressure of from about atmospheric to about 700 p.s.i., and recovering the resulting aromatic amine.

10. A process which comprises reacting monoalkylcyclopentene hydrocarbon with ammonia in the presence of nickel on an alumina support at a temperature of from about 200° C. to about 800° C. and at a pressure of from about atmospheric to about 700 p.s.i., and recovering the resulting aromatic amine.

11. A process which comprises reacting alkylclopentene hydrocarbon with ammonia in the presence of cobalt on a silica-alumina support at a temperature of from about 400° C. to about 600° C. and at a pressure of from about 50 p.s.i. to about 500 p.s.i., and recovering the resulting aromatic amine.

12. A process which comprises reacting monoalkylcyclopentene hydrocarbon with ammonia in the presence of cobalt on a silica-alumina support at a temperature of from about 400° C. to about 600° C. and at a pressure of from about 50 p.s.i. to about 500 p.s.i., and recovering the resulting aromatic amine.

13. A process which comprises reacting alkylcyclopentene hydrocarbon with ammonia in the presence of nickel on a silica-alumina support at a temperature of from about 400° C. to bout 600° C. and at a pressure of from about 50 p.s.i. to about 500 p.s.i., and recovering the resulting aromatic amine.

14. A process which comprises reacting monalkylcyclopentene hydrocarbon with ammonia in the presence of nickel on a silica-alumina support at a temperature of from about 400° C. to about 600° C. and at a pressure of from about 50 p.s.i. to about 500 p.s.i., and recovering the resulting aromatic amine.

15. A process for the preparation of aniline which comprises reacting methylcyclopentene with ammonia in the presence of cobalt on a silica-alumina support at a temperature of from about 400° C. to about 600° C. and at a pressure of from about 50 p.s.i. to about 500 p.s.i., and recovering the resulting aniline.

16. A process for the preparation of toluidine which comprises reacting 1,2-dimethylcyclopentene with ammonia in the presence of cobalt on a silica-alumina support at a temperature of from about 400° C. to about 600° C. and at a pressure of from about 50 p.s.i. to about 500 p.s.i., and recovering the resulting toluidine.

17. A process for the preparation of toluidine which comprises reacting 1-ethylcyclopentene with ammonia in the presence of cobalt on a silica-alumina support at a temperature of from about 400° C. to about 600° C. and at a pressure of from about 50 p.s.i. to about 500 p.s.i., and recovering the resulting toluidine.

18. A process for the preparation of xylidine which comprises reacting 1,2,4-trimethylcyclopentene with ammonia in the presence of cobalt on a silica-alumina support at a temperature of from about 400° C. to about 600° C. and at a pressure of from about 50 p.s.i. to about 500 p.s.i., and recovering the resulting xylidine.

19. A process for the preparation of aniline which comprises reacting methylcyclopentene with ammonia in the presence of nickel on a silica-alumina support at a temperature of from about 400° C. to about 600° C. and at a pressure of from about 50 p.s.i. to about 500 p.s.i., and recovering the resulting aniline.

References Cited in the file of this patent

UNITED STATES PATENTS

| | | |
|---|---|---|
| 2,252,928 | Marschner | Aug. 19, 1941 |
| 2,331,968 | Forney | Oct. 19, 1943 |
| 2,864,875 | McKinley et al. | Dec. 16, 1958 |
| 2,916,490 | Schenck et al. | Dec. 8, 1959 |

OTHER REFERENCES

Plate et al.: Vestnik Moscow University, vol. 10, #2, Seriya Fiziko Matematecheskikh: Estestvenykh Nauk, pages 77 to 80 (1955).